United States Patent [19]

Besne et al.

[11] Patent Number: 4,818,221

[45] Date of Patent: Apr. 4, 1989

[54] PROCESSES AND DEVICES FOR MELTING MATERIALS CAPABLE OF FORMING FIBERS

[75] Inventors: Michel Besne, Saint-Etienne du Rouvray; Fernand Guillot, Le Mesnil Esnard, both of France

[73] Assignee: Isover Saint-Gobain, Courbevoie, France

[21] Appl. No.: 49,219

[22] Filed: May 13, 1987

[30] Foreign Application Priority Data

May 13, 1986 [FR] France ............................... 86 06821

[51] Int. Cl.⁴ .............................................. F27D 1/08
[52] U.S. Cl. ........................................ 432/99; 65/5; 65/19; 65/135; 432/100; 432/156; 432/159
[58] Field of Search ........................ 432/95, 96, 98, 99, 432/100, 101, 156, 159, 160, 173; 266/171, 197, 214, 227, 232, 240, 265, 900; 65/134, 135, 136, 335, 2, 5, 19, 10.2

[56] References Cited

U.S. PATENT DOCUMENTS

| | | | |
|---|---|---|---|
| 2,020,403 | 11/1935 | Engle | 65/10.2 |
| 2,524,476 | 10/1950 | Richardson | 432/100 |
| 3,002,734 | 10/1961 | Koopal | 432/100 X |
| 3,108,869 | 10/1963 | Ellis | 266/197 X |
| 3,294,505 | 12/1966 | Garrison | 432/100 X |
| 3,887,326 | 6/1975 | Townley | 432/14 |
| 3,998,619 | 12/1976 | Cerutti et al. | 65/136 |
| 4,140,480 | 2/1979 | Kaiser et al. | 266/900 X |
| 4,291,634 | 9/1981 | Bergsten et al. | 266/227 X |
| 4,655,437 | 4/1987 | Fritz et al. | 266/197 |
| 4,664,691 | 5/1987 | Debouzie et al. | 65/19 X |

FOREIGN PATENT DOCUMENTS 3106859 9/1982 Fed. Rep. of Germany .

Primary Examiner—Steven E. Warner
Attorney, Agent, or Firm—Oblon, Fisher, Spivak, McClelland & Maier

[57] ABSTRACT

An improved charging process for an enclosure for melting materials such as blast furnace slags or basaltic glasses. The supply of combustive gas is carried out nonuniformly in order to create a gas circulation velocity gradient in the section of the cupola corresponding to the level of the tap hole, with the lowest circulation velocities meeting in the vicinity of the tap hole.

8 Claims, 1 Drawing Sheet

U.S. Patent
Apr. 4, 1989
4,818,221
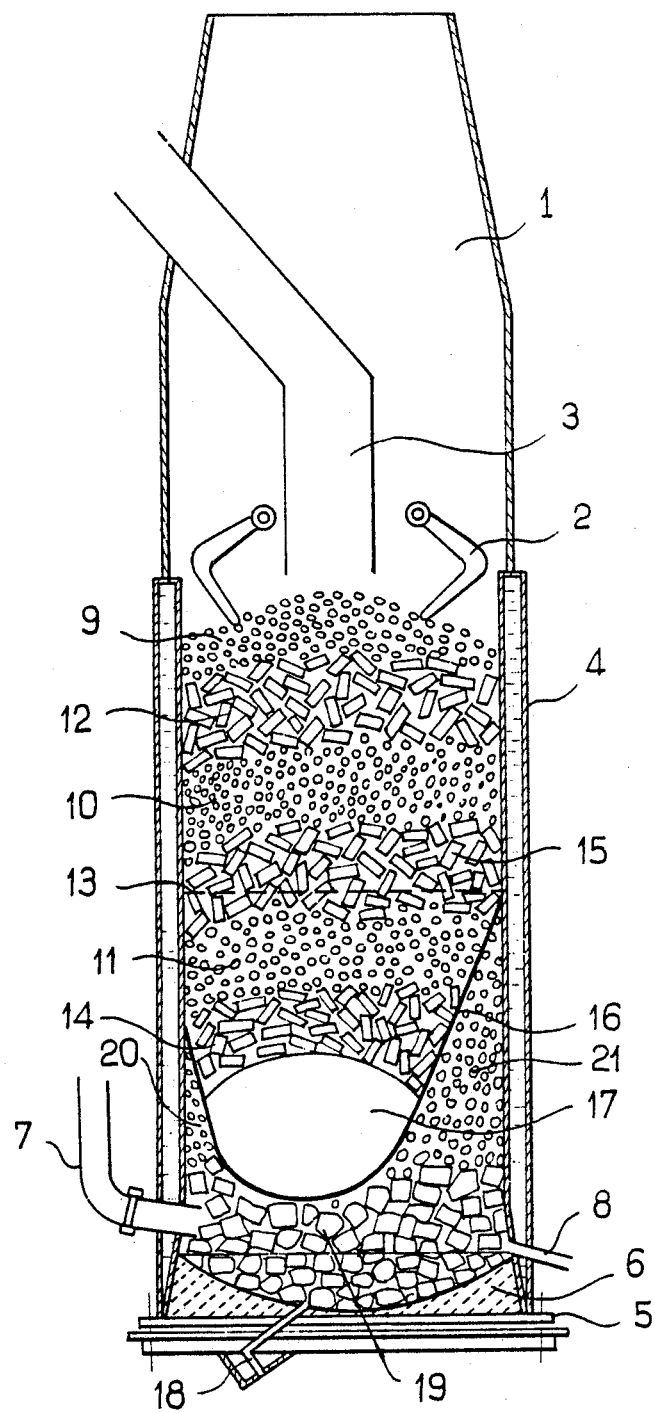

PROCESSES AND DEVICES FOR MELTING MATERIALS CAPABLE OF FORMING FIBERS

BACKGROUND OF THE INVENTION

1. Field of the Invention

The invention relates to the melting of materials, which are capable of being drawn, such as basaltic glasses, blast furnace slags and the like, with a view of the industrial production of rock wool.

2. Discussion of Background

It is known to convey the material to be formed into fibers, in the molten state, at the periphery of three or four centrifuging wheel, arranged close to each other, the material being poured onto a first wheel which accelerates it and being sent on to the next wheel. Each wheel converts a proportion of the melt and sends the excess on to the next wheel.

These techniques for the production of rock wool from high melting point materials are more generally known as free centrifuging. They have already formed the subject of numerous improvements which are aimed particularly at an improvement in the yield of fibers. It has thus been shown that the percentage of products not converted into fibers is reduced by an optimization of the wheel diameter and speed of rotation of the wheels. Similarly, the surface quality of the wheels affects the drawing of the fibers, according to whether it does or does not promote melt adhesion. Other proposals refer to the circulation of gas around the centrifuging wheels.

Furthermore, French patent application FR No. 84/16,547 proposes to control the conditions under which the melt is conveyed from the melting enclosure to the first centrifuging wheel. For this purpose, a reserve is inserted in the path of the melt, and this ensures homogenization of the temperature and of the composition of this material. In addition, the establishing of this reserve ensures a more uniform flow of the melt originating from the melting enclosure.

In point of fact, the material is commonly melted in furnaces of the "cupola" type, employed in foundry practice. The upper part of the cupolas are charged with successive alternating layers of fuel, generally coke, and of the material to be made into fibers. The combustion zone is situated in the lower region of the cupola, in the vicinity of the tuyeres through which the combustive gas is blown in, generally air, oxygen-enriched if desired. The temperature produced by the combustion causes melting of the material to be made into fibers, and this escapes through a tap hole or conduit situated at a level which is slightly lower than the level of the tuyeres. Lastly, the molten iron residues, originating either from the nodules included in the slag or from the reduction of iron oxides in the remainder of the charge, accumulate at the bottom of the cupola. Although the denser molten iron separates naturally from the melt to be made into fibers, the tap hole must be at a level which is as high as possible in order not to permit a concurrent escape of small quantities of molten iron, which would cause rapid wear of the centrifuging wheels.

Melting enclosures of this kind are highly advantageous, considering the very high flows of the molten products and the low energy cost of this melting. However, these cupolas produce a highly nonuniform flow of molten material, as is emphasized in French patent application Fr No. 84/16,547.

The flow irregularities are due to many causes. In a stationary regime, the level of the combustive and fuel charges is, in fact, substantially constant; however, collapses of charges, especially of coke, take place at uniform intervals, and these result in entrainment of unburned pieces of coke with the melt stream. These coke particles are particularly damaging to the plant, because they increase the quantity of unmelted products and, above all, the fibers produced simultaneously with this coke entrainment have to be removed because of the risk of forming a flammable product.

Furthermore, as indicated earlier, in order to reduce the entrainment of molten iron, the tap hole for the materials to be made into fibers needs to be situated at a relatively high level, in other words in the vicinity of the combustion zone and of the injection tuyeres for the combustive gas. The tap hole for the material to be made into fibers is therefore situated in a region where high turbulence prevails and large quantities of gas or even of solid materials escape in the direction of the centrifuging wheels.

SUMMARY OF THE INVENTION

The object of the present invention is to provide an improved charging process for a melting enclosure of the cupola type making it possible to produce a more regular flow of materials which are capable of being drawn, such as basaltic glasses, blast furnace slags or other products employed for the production of what are known as rock fibers.

This and other objects which will become apparent from the following specification have been achieved by the present process in which the charging of the cup to with combustive gas is carried out nonuniformly in order to create a gas circulation velocity gradient in the section of the cupola corresponding to the level of the tap hole, with the lowest circulation velocities meeting in the vicinity of the tap hole.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, which shows an operating diagram of a cupola according to the invention.

DETAILED DESCRIPTION OF THE PREFERRED EMBODIMENTS

Surprisingly, the establishing of a gas circulation velocity gradient of this kind permits an increase in the quantity of air injected into the cupola, and this is beneficial to heat production. Since the gases travel at low speed in the vicinity of the tap hole, their tendency to escape with the melt is greatly reduced.

This gas circulation velocity gradient is preferably such that the total pressure measured relative to atmospheric pressure in the pouring sill remains below 60% of the pressure in the first tuyere, that is to say in the tuyere which is closest to the pouring sill.

This increase in the quantity of injected air is preferably obtained without an increase in the nominal flow in the cupola section at the injection tuyeres. This is obtained by means of a cupola consisting of a cylindrical enclosure of constant cross-section. Although a normal flow which is high in relation to the cross-section of the cupola at the tuyeres theoretically promotes coke combustion, it has, in fact, become apparent according to the invention that the tendency for the melting materials to take-off is then very high and compensates for this advantage. Furthermore, with a large cupola cross-section in the region of the air injection tuyeres, a gas circulation velocity gradient is established more easily.

To establish the latter, it is possible, for example, to employ a cupola equipped with a series of air injection tuyeres which are uniformly spaced over the entire circumference and to feed these tuyeres at different flow rates depending on their distance from the tap hole, for example with virtually zero flowrates in the case of the tuyeres placed on either side of the tap hole.

According to another preferred characteristic of the invention, the melt flow is made still more uniform by protection of the surroundings of the tap hole. The tap hole obviously forms the upper limit of the liquid level, or more precisely the lower limit of the level of free circulation of gases. To reduce the percentage of gas which is dissolved in the liquids and to avoid the entrainment of unoxidized particles of coke or of raw materials which are still in the solid state towards the tap hole, it is proposed, according to the invention, to fill the bottom of the cupola with a charge of coke, up to the tap hole level. Being situated under the combustion zone, in an anaerobic zone, this coke charge does not make a direct contribution to the production of heat. On the contrary, it acts as a filter. It also supports the initial charge of raw materials and/or of coke before a stationary operating regime is established.

This initial coke charge preferably consists of blocks of coke of a large size, placed on the bottom of the cupola after the latter has been protected by a monolithic lining material. These blocks of coke are preferably approximately cubic with dimensions of about $20\times20\times20$ cm$^3$.

The combination of the presence of this filter which is formed by the blocks of coke with the establishment of a gas circulation velocity gradient, which ensures a low circulation velocity in the region close to the tap hole, provides a melt flow which is very uniform and homogeneous in composition, and this leads to an improvement of the yield of the fiber-forming operation.

Since the rock melts relatively slowly, care must be taken that the combustive gases and the combustion gases can circulate very easily in the melting zone and, above all, can escape in the direction of the chimney stack. Because of this, the charge must not be too compact, because otherwise an overpressure would be created in the melting zone, and this overpressure leads to an increase in turbulence in the pouring region. For this reason, the charge of raw material is preferably introduced in the form of extruded, for example cylindrical, blocks or briquettes. A charge preparation method of this kind is well known, for example from U.S. Pat. No. 2,020,403. It offers the additional advantage of permitting the recovery of the unmelted materials, of fiber scrap, and an adjustment in the composition of raw materials.

A melting enclosure for basaltic glasses, metallurgical blast furnace slags or other products with high melting points should heat the charge very rapidly, at a low energy cost and without the need for frequent interruptions of production. The melting processes should take into account, on the one hand, the low purchase price of the raw materials—what is involved is, in fact a profitable recovery of waste products of steelmaking, for example—and, on the other hand, the average yields of fibers which can be obtained by means of the fiber-forming processes employing free centrifuging. In order to be capable of being exploited on an industrial scale, a process which improves the melting capacity must therefore be simple and easy to implement.

The quantity of heat required to raise the rock or slag charge to its melting temperature is provided by the combustion of coke, the charges of raw materials and of coke being introduced in alternate layers or, if desired, simultaneously, using a mixture of raw materials and fuel. It is well known that coke combustion normally takes place in the low part of the cupola, and more precisely in the section between the tuyeres and 500 to 800 mm above. This combustion consumes the oxygen in the tuyere air according to the reaction $C+O_2=CO_2$, the hot gases released transferring their heat to the charge situated above, causing it to melt.

Up to approximately 900° C., a proportion of the carbon present in the charge is consumed in an endothermic reaction with carbon dioxide, producing carbon monoxide.

When, starting at this stage, it is intended to increase the throughput of the unit, the quantity of air introduced must be increased, so as to increase the rate of conversion of the coke to carbon dioxide and to heat, and consequently the throughput of materials changing from the solid state into the liquid state. Now, we have found that, for a given cupola, this increase has a limit which we attribute to the effect of turbulence in the low part of the unit: under certain conditions of excessive turbulence, the coke burns faster than the charge melts, with the result that the quantity of coke which is still present in the combustion zone is too low. Oxygen, being no longer consumed in the low part, remains available for reaction with the coke situated in the upper zones or strata, and this causes an irreversible rise of the combustion zone and a stoppage of the operation of the unit, due to blocking of the column of materials, from the bottom parts.

In order to avoid this configuration, an attempt is generally made to increase the quantity of coke per charge, but the chief result is the conversion of this excess coke into carbon monoxide, without an appreciable increase in the maximum flowrate.

A better solution is to heat the tuyere air to 400° to 600° C. The flowrate limit of the unit is thus extended since, at equal composition, a smaller quantity of coke, and hence of air, is required to produce melting.

Additionally, since the tap hole for the material capable of being drawn must be situated at a sufficiently high level for good phase separation of the molten iron occluded in the molten material, it is situated very close to the combustion and the combustive gas injection zone. An increase in the gas flowrate therefore corresponds to an increase in the turbulence at the tap hole and flow is then nonuniform and, furthermore, unmelted substances, and molten iron, are liable to be entrained towards the centrifuging wheels and to cause their rapid wear.

In order to remedy this, and as shown diagrammatically in FIG. 1, the invention proposes to charge the cupola with air in a nonuniform manner in order to create a gas circulation velocity gradient at the injection tuyeres, with the lowest circulation velocities meeting in the vicinity of the tap hole. In this manner, the cupola can operate at higher mean gas circulation velocities and flowrates without increase in the turbulence in the tap hole region. While operating, the cupola thus has only one plane of symmetry, the vertical plane sectioning the tap hole employed in FIG. 1.

The staging of the various zones of a cupola has been shown diagrammatically in the Figure.

The cupola, supporting a chimney 1 equipped with gas purification devices, which are not shown here, is equipped with a charging device 2 fed by an endless belt 3. The side walls 4 of the cupola are lined for a cooling system using water. Its bottom 5 is preferably demountable and fastened in a leakproof manner to the walls, by being bolted on. In addition, it is carefully protected by a monolithic lining material 6. These lining materials are well known to those in the art. The supply of combustive gases takes place via tuyeres 7. A multiplicity of tuyeres, preferably twelve in number, are placed in pairs spaced uniformly at 60° to other pairs. The tap hole 8 is placed between two tuyeres, slightly below them. The melt stream flows out of the tap hole via a pouring sill and is preferably received by means of a crucible in accordance with the teaching of the application FR No. 84/16,547. The material is then directed by means of a gutter towards the first centrifuging wheel, known as a distribution wheel, for the production of fibers.

The molten products accumulate up to the level of the tap hole 8. An excessive quantity of dissolved gases below this level must be avoided, because they give rise to flow irregularities. In any event, the tap hole 8 cannot be situated on the bottom of the cupola when use is made of raw materials whose composition includes substantial quantities of iron oxide, as is the case, in particular, with basaltic rocks. In point of fact, in addition to damaging the fiber, molten iron leads to rapid wear of the centrifuging wheels; it is therefore necessary to allow it to separate by gravity at the bottom of the cupola and to remove it at regular intervals, by tapping through the bottom 5 and the monolithic lining material 6, along the runner trough 18. The levels of the two liquids, molten iron and molten rock, are thus kept well apart.

It should also be stressed that, in contrast to the conventional melting enclosures, the cupola according to the invention is preferably of substantially uniform cylindrical cross-section with the result that it can be fed at very high combustive gas flowrates while having a circulation velocity which is relatively lower in relation to the cross-section, than for the cupolas with a bottom part of reduced diameter. A cupola of this kind, with low gas circulation velocity, permits very high melt flowrates.

The solid charges are introduced, for example, in the form of alternate strata of fuels (9, 10, 11) and of material to be melted (12, 13, 14).

Coke in the form of lumps of fairly large diameter and with a particle size greater than 150 mm is more particularly preferred as fuel. Depending on the type of products required and on local availability, the material to be melted is a blast furnace slag, basaltic rocks or other. In accordance with the teaching of U.S. Pat. No. 2,020,403, a proportion of the material to be melted is preferably charged in the form of briquettes which are, for example, cylindrical or parallelepipedal and are produced by extrusion of the wet material. The fiber production wastes such as materials unconverted to fibers, materials rejected by wash water filters, and boiler scale are thus agglomerated with the aid of a clay and are recycled. In practice, about 15% of the melt charge consists of recycled products. This melt preparation makes it possible to adjust its composition and especially to enrich it in alumina with the aid of clay or bauxite, and this enables the quality of the fibers to be improved. In addition, the storage and the charging of the material to be melted become easier when briquettes are used.

The main advantage of the use of briquettes, however, is revealed at the time of melting. In fact, when the briquettes are poured into the cupola, they distribute themselves in random manner, with a low filling coefficient, on the order, for example, of 80% of the available space. In practice, this allows the gases to circulate freely between the briquettes and prevents the formation of localized overpressures. For these reasons, the coke is preferably of the 60/100 type, and this also ensures a low filling coefficient, contrary to what has been shown diagrammatically in the figure in order to differentiate more clearly the charges of coke and of the material to be melted.

The charges 9 to 14 are renewed throughout the period of operation of the furnace, that is for a period of 2 to 3 months. For starting up the furnace, they are supported by an initial charge of coke which occupies at least the whole lower half of the cupola. In a particular case, the broken line 15 indicates the height attained by the initial coke charge.

In a stationary operating regime, this initial charge remains only on the outside of a melting paraboloid 16, dead zones in which no chemical reaction takes place. According to the invention, and as shown here, the axis of revolution of the paraboloid 16 does not coincide with the axis of symmetry of the furnace, but is offset and well away from the tap hole 8. This is obtained by adjusting the air supply tuyeres 7 so that the total pressure at the tap hole 8 is always less than 3000 Pa and preferably less than 2900 Pa, while the quantity of injected air can reach 6200 $Nm^3/h$, that is a total pressure of 4900 Pa in the region of the tuyeres 7. A very high gas circulation velocity gradient is thus established, with a turbulence zone 17 which is very far from the tap hole. This leads directly to a very large decrease in the irregularities in the flow rate of the melt flowing out through the tap hole. Thus, for a molten rock flow rate of 8 tons/hour, the standard deviation of a flow rate measured in the case of a symmetrical air supply is 10%. When, on the other hand, the tuyere feed is regulated in accordance with the invention, the standard deviation drops to only 6%. This may be produced in a very simple manner by no longer feeding the four tuyeres closest to the tap hole, while maintaining the same injected air flow rate. Preferably, however, the feed to the twelve tuyeres is maintained, but the flow rate injected by each tuyere is regulated in relation to the tap hole. For this purpose, each tuyere is fed by its own pump. In this manner, it is possible to keep the position of the paraboloid 16 under tight control and to modify it during operation. Similarly, it is possible to reach offtakes of more than 10 tons/hour while flow rate irregularities remain acceptable, that is to say below 10%.

Offtakes of this kind can be envisaged only when good removal of the fuel gases is possible and, consequently, with charges which are introduced in briquette form, as indicated earlier.

In addition, it is then particularly advantageous to use the initial coke charge as a filtering charge.

Since, according to the invention, the melting paraboloid 16 is off-centered, the tap hole 8 is situated in a very large dead zone in which the coke of the initial charge is never oxidized. The lower part of this initial charge may thus consist of very large blocks of coke 19, a poor fuel, but this is of no importance in this case, but which can be placed very carefully, so as to offer a higher, but perfectly distributed porosity. These blocks 19 thus form a series of obstacles which force the melt to become homogeneous, to separate off its molten iron by gravity, and to entrain as far as the tap hole only the coke particles which are too small to obstruct the tap hole and which are readily burned subsequently in the crucible placed downstream. The correct placing of the blocks 19 is made very much easier if, in a predetermined manner, a cupola with a removable bottom is employed, such as described earlier. This placing may then be performed manually. Above the entry level of the tuyeres 7, the initial charge should consist of coke which is identical with the coke in the strata 9, 10 and 11, even though no chemical reactions take place in the regions 20 and 21 which are outside the melting paraboloid 16.

Thus, the process according to the invention appreciably improves the melt tonnages without producing a corresponding increase in the cost of the treatment of the fuel and material charges, or in that of the melting enclosure, and does this by virtue simply of a more suitable distribution of all the charges, be they fuel, combustive material and raw material charges. In addition, this process may, if desired, be implemented using plants which are already constructed, and this constitutes an advantage which is of particular interest.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An improved process for charging a melting enclosure of the cupola type for melting a high-melting point rock wool-forming material, said cupola having a multiplicity of tuyeres and said cupola having a tap hole for removing the melted material from said cupola, said tap hole being in fluid communication with a pouring still external to said cupola, comprising the steps of:
    charging said cupola with coke and said high-melting point rock wool-forming material; and
    supplying combustive gas in a non-uniform manner to create a gas circulation velocity gradient in the section of said cupola corresponding to the level of said tap hole, wherein the lowest circulation velocities are substantially close to said tap hole and wherein the total pressure measured in said pouring sill near said tap hole is less than 60% of the pressure in the tuyere closes to said tap hole, and the melt flow of the melted material through the tap hole is substantially uniform and homogeneous.

2. The process of claim 1, wherein said charging step comprises adding alternating layers of coke and high-melting point material.

3. The process of claim 1, wherein said high-melting point material is added in the form of parallelepipedal or cylindrical briquettes.

4. The process of claim 1, wherein said coke comprises 60/100 type coke.

5. The process of claim 1, wherein the total pressure measured in said pouring sill is below 3000 Pa.

6. The process of claim 5, wherein the total pressure measured in said pouring sill is below 2900 Pa.

7. The process of claim 1, further comprising: placing an initial coke charge in the bottom of said cupola before said charging step.

8. The process of claim 7, wherein the lower part of said initial coke charge comprises large blocks of coke.

* * * * *